(12) United States Patent
Park et al.

(10) Patent No.: US 10,084,986 B2
(45) Date of Patent: Sep. 25, 2018

(54) SYSTEM AND METHOD FOR VIDEO CALL USING AUGMENTED REALITY

(71) Applicant: MAXST CO., LTD., Seoul (KR)

(72) Inventors: Jae Wan Park, Ulsan (KR); Gi Suk Kwon, Incheon (KR); Seung Gyun Kim, Seoul (KR)

(73) Assignee: MAXST CO., LTD., Seoul (KR)

( * ) Notice: Subject to any disclaimer, the term of this patent is extended or adjusted under 35 U.S.C. 154(b) by 0 days.

(21) Appl. No.: 15/671,305

(22) Filed: Aug. 8, 2017

(65) Prior Publication Data

US 2018/0020180 A1 Jan. 18, 2018

(30) Foreign Application Priority Data

Jun. 8, 2016 (KR) .......................... 10-2016-0070926

(51) Int. Cl.
*H04N 7/14* (2006.01)
*H04N 5/445* (2011.01)
(Continued)

(52) U.S. Cl.
CPC ............. *H04N 5/445* (2013.01); *G06Q 50/00* (2013.01); *G06T 7/50* (2017.01); *G06T 7/73* (2017.01); *G06T 19/006* (2013.01); *H04L 67/38* (2013.01); *H04N 7/141* (2013.01); *H04N 7/147* (2013.01); *G06T 2207/20212* (2013.01); *H04L 65/403* (2013.01); *H04M 3/567* (2013.01)

(58) Field of Classification Search
CPC ......... G06T 19/006; G06T 2207/20212; G06T 7/50; G06T 7/73; H04L 65/403; H04L 67/38; H04M 3/567; H04N 5/445; H04N 7/147

USPC ....................................................... 348/14.07
See application file for complete search history.

(56) References Cited

U.S. PATENT DOCUMENTS 7,441,198 B2 * 10/2008 Dempski ................. G06F 3/017
348/E7.083
8,681,177 B2 * 3/2014 Tsujimoto ................ H04N 7/18
345/629
(Continued)

FOREIGN PATENT DOCUMENTS

KR 10-0816442 B1 3/2008
KR 10-1099838 B1 12/2011
(Continued)

OTHER PUBLICATIONS

Office action dated Feb. 16, 2017 from Korean Patent Office in a counterpart Korean Patent Application No. 10-2016-0070926.
(Continued)

*Primary Examiner* — Khai N. Nguyen
(74) *Attorney, Agent, or Firm* — The PL Law Group, PLLC

(57) ABSTRACT

An augmented reality-based video calling system includes a first terminal configured to capture a video and a second terminal configured to add virtual content to the video captured by the first terminal and provide information regarding the added virtual content to the first terminal. The first terminal calculates 3D position coordinates of the virtual content in a 3D space corresponding to the video on the basis of the provided information regarding the virtual content, combines the virtual content with the video using the calculated 3D position coordinates, and display the virtual content combined with the video.

8 Claims, 5 Drawing Sheets

(51) Int. Cl.
  *G06T 7/50*    (2017.01)
  *G06T 7/73*    (2017.01)
  *G06T 19/00*   (2011.01)
  *H04L 29/06*   (2006.01)
  *G06Q 50/00*   (2012.01)
  *H04M 3/56*    (2006.01)

(56) References Cited

U.S. PATENT DOCUMENTS

| | | | | |
|---|---|---|---|---|
| 9,122,321 | B2* | 9/2015 | Perez | G06F 3/033 |
| 9,195,871 | B2* | 11/2015 | Zhou | G06F 3/017 |
| 9,430,835 | B2* | 8/2016 | Zhou | G06F 3/017 |
| 2003/0179194 | A1* | 9/2003 | Robert | G06T 17/20 |
| | | | | 345/419 |
| 2007/0242086 | A1* | 10/2007 | Tsujimoto | G06T 19/006 |
| | | | | 345/632 |
| 2009/0109241 | A1* | 4/2009 | Tsujimoto | H04N 7/18 |
| | | | | 345/633 |
| 2010/0303444 | A1* | 12/2010 | Sasaki | G11B 27/105 |
| | | | | 386/248 |
| 2011/0129198 | A1* | 6/2011 | Toma | G11B 27/3027 |
| | | | | 386/239 |
| 2011/0187744 | A1* | 8/2011 | Kim | H04M 1/72572 |
| | | | | 345/633 |
| 2013/0208098 | A1* | 8/2013 | Pujol Alcolado | H04N 13/0239 |
| | | | | 348/47 |
| 2014/0160164 | A1* | 6/2014 | Tsujimoto | H04N 7/18 |
| | | | | 345/633 |
| 2016/0127710 | A1* | 5/2016 | Saban | G02B 5/08 |
| | | | | 386/241 |
| 2018/0020180 | A1* | 1/2018 | Park | H04N 5/445 |

FOREIGN PATENT DOCUMENTS

| | | |
|---|---|---|
| KR | 10-2012-0008400 A | 1/2012 |
| KR | 10-1126449 B1 | 3/2012 |
| KR | 10-2014-0146889 A | 12/2014 |

OTHER PUBLICATIONS

Notice of Allowance dated Jul. 28, 2017 from Korean Patent Office in a counterpart Korean Patent Application No. 10-2016-0070926.

* cited by examiner

SYSTEM AND METHOD FOR VIDEO CALL USING AUGMENTED REALITY

CROSS REFERENCE TO RELATED APPLICATIONS AND CLAIM OF PRIORITY

This application claims priority to the benefit of Korean Patent Application No. 10-2016-0070926 filed in the Korean Intellectual Property Office on Jun. 8, 2016, the entire contents of which are incorporated herein by reference.

BACKGROUND

1. Field

Embodiments of the present disclosure relate to a video calling technology using augmented reality.

2. Discussion of Related Art

A video call is a phone call allowing a user to see a person he or she is talking to on his or her phone. Recently, along with the popularization of smartphones and the emergence of various video call solutions, the usage rate of video calls is increasing.

An initial video call was just a face-to-face call, but recently video calls are applied to various fields such as online conferencing, remote support, or the like. However, pre-existing video call solutions have limitations in delivering additional information other than in delivering videos between calling parties.

Embodiments of the present disclosure are intended to facilitate an exchange of information between video call participants by using an augmented reality technology.

According to an aspect of the present disclosure, there is an augmented reality-based video calling system including a first terminal configured to capture a video; and a second terminal configured to add virtual content to the video captured by the first terminal and provide information regarding the added virtual content to the first terminal, wherein the first terminal calculates 3D position coordinates of the virtual content in a 3D space corresponding to the video on the basis of the provided information regarding the virtual content, combines the virtual content with the video using the calculated 3D position coordinates, and displays the virtual content combined with the video.

The information regarding the virtual content may include information regarding a type of the virtual content and 2D position coordinates of the virtual content in the video.

The first terminal may generate a 3D spatial map from the video, calculate a depth of a point corresponding to the 2D position coordinates in the generated 3D spatial map, and combine the 2D position coordinates with the calculated depth to generate the 3D position coordinates.

The first terminal may select N feature points (N is a natural number greater than or equal to 1) adjacent to the 2D position coordinates from among feature points in the 3D spatial map and calculate the depth of the point corresponding to the 2D position coordinates from depths of the selected N feature points.

The first terminal may recalculate the 3D position coordinates at predetermined intervals.

According to another aspect of the present disclosure, there is an augmented reality-based video calling method, which is performed by a computing apparatus including one or more processors and a memory configured to store one or more programs executed by the one or more processors, the augmented reality-based video calling method including capturing a video and transmitting the captured video to a partner terminal for video calling; receiving information regarding virtual content added to the video from the calling partner; calculating 3D position coordinates of the virtual content in a 3D space corresponding to the video on the basis of the received information regarding the virtual content; and combining the virtual content with the video using the calculated 3D position coordinates and displaying the virtual content combined with the video.

The information regarding the virtual content may include information regarding a type of the virtual content and 2D position coordinates of the virtual content in the video.

The calculating of 3D position coordinates may include generating a 3D spatial map from the video; calculating a depth of a point corresponding to the 2D position coordinates in the generated 3D spatial map; and combining the 2D position coordinates with the calculated depth to generate the 3D position coordinates.

The calculating of a depth may include selecting N feature points (N is a natural number greater than or equal to 1) adjacent to the 2D position coordinates from among feature points in the 3D spatial map and calculating the depth of the point corresponding to the 2D position coordinates from depths of the selected N feature points.

According to still another aspect of the present disclosure, there is a computer program stored in a non-transitory computer-readable storage medium and including one or more instructions, wherein when the instructions are executed by a computing apparatus having one or more processors, the instructions enable the computing apparatus to perform operations of capturing a video and transmitting the captured video to a partner terminal for video calling; receiving information regarding virtual content added to the video from the calling partner; calculating 3D position coordinates of the virtual content in a 3D space corresponding to the video on the basis of the received information regarding the virtual content; and combining the virtual content with the video using the calculated 3D position coordinates and displaying the virtual content combined with the video.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only exemplary, and the present disclosure is not limited thereto.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure, and may be changed depending on a user, the intent of an operator, or a custom. Accordingly, the terms should be defined based on the following overall description of this specification. The terminology used herein is only for the purpose of describing embodiments of the present disclosure and is not restrictive. The singular forms "a," "an," and "the" are intended to include the plural forms as well, unless the context clearly indicates otherwise. It should be understood that the terms "comprises," "comprising," "includes," and/or "including," specify the presence of stated features, integers, steps, operations, elements, and/or components when used herein, but do not preclude the presence or addition of one or more other features, integers, steps, operations, elements, components, and/or groups thereof.

Figure 1:
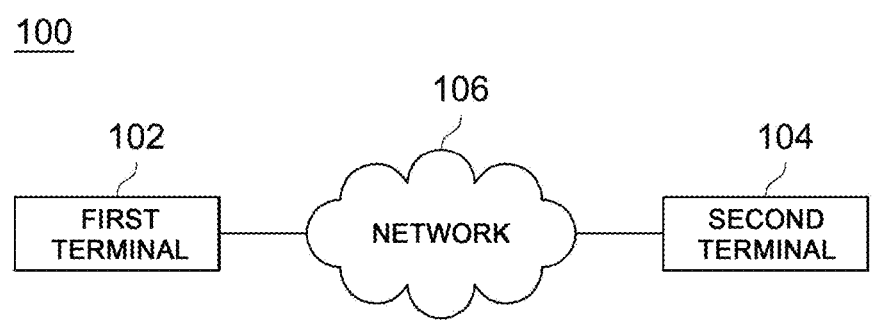
FIG. 1 is a block diagram illustrating an augmented reality-based video calling system using according to an embodiment of the present disclosure.

FIG. 1 is a block diagram illustrating an augmented reality-based video calling system 100 using augmented reality according to an embodiment of the present disclosure. As shown, the augmented reality-based video calling system 100 according to an embodiment of the present disclosure includes a first terminal 102 and a second terminal 104.

The first terminal 102 is a terminal for capturing a video, transmitting the captured video to a second terminal 104, receiving information regarding virtual content added to the video from the second terminal 104, combining the virtual content with the video, and displaying the virtual content combined with the video. In disclosed embodiments, the first terminal 102 may be a mobile communication device such as a cell phone and a smartphone, a personal computing device such as a tablet computer and a notebook computer, or a wearable device such as a see-through-type head mounted display.

The first terminal 102 includes a video capture means for capturing a video and/or a display means for displaying the captured video and/or virtual content. For example, the first terminal 102 may be a device that is used by a field worker who makes a video call to a remote technical expert in real time. In this case, the worker may capture a real-time video of a device or apparatus that needs a consultation of a remote technical expert by means of the first terminal 102 and may transmit the captured video to the second terminal 104.

The second terminal 104 is a terminal for receiving the video captured by the first terminal 102, adding virtual content to the video, and then providing information regarding the added virtual content to the first terminal 102. Like the first terminal 102, the second terminal 104 may be a mobile communication device such as a cell phone and a smartphone, a personal computing device such as a tablet computer and a notebook computer, or a wearable device such as a see-through-type head mounted display.

The second terminal 104 includes a display means for displaying the video received from the first terminal 102 and an input means for adding virtual content to the video. In an embodiment, the input means may be an input device such as a keyboard, a mouse, or a touch pad, a touch interface for directly touching a displayed video to add virtual content to the video, or the like. For example, the second terminal 104 may be a device that is remotely connected with a field worker and used by an expert who advises the worker. In this case, the remote expert may view a video received from a field worker through the second terminal 104 and may give an appropriate instruction to the workers using the virtual content. In disclosed embodiments, although the virtual content may be a figure such as a circle, a polygon, an arrow, and a star, text, a work manual, or an image, the embodiments of the present disclosure are not limited to certain types of virtual content.

When a user of the second terminal 104 adds virtual content to a video, the second terminal 104 transmits information regarding the added virtual content to the first terminal 102. In this case, the information regarding the virtual content may include information regarding the type of added virtual content and two-dimensional (2D) position coordinates of the virtual content in the video. Subsequently, the first terminal 102 calculates three-dimensional (3D) position coordinates of the virtual content in a 3D space corresponding to the video on the basis of the information regarding the virtual content received from the second terminal 104, combines the virtual content with the video using the calculated 3D position coordinates, and displays the virtual content combined with the video.

The first terminal 102 and the second terminal 104 are connected to each other through a network 106 and configured to send and receive data to and from each other. In disclosed embodiments, the network 106 may include the Internet, one or more local area networks, wide area networks, cellular networks, mobile networks, other types of networks, or a combination thereof. Also, according to embodiments of the present disclosure, the network 106 may include one or more servers for providing a video call service between the first terminal 102 and the second terminal 104. For example, the server may provide a video call service between the first terminal 102 and the second terminal 104 using webRTC technology or the like. However, it is noted that embodiments of the present disclosure are not limited to a specific kind or type of video call technology.

Figure 2:
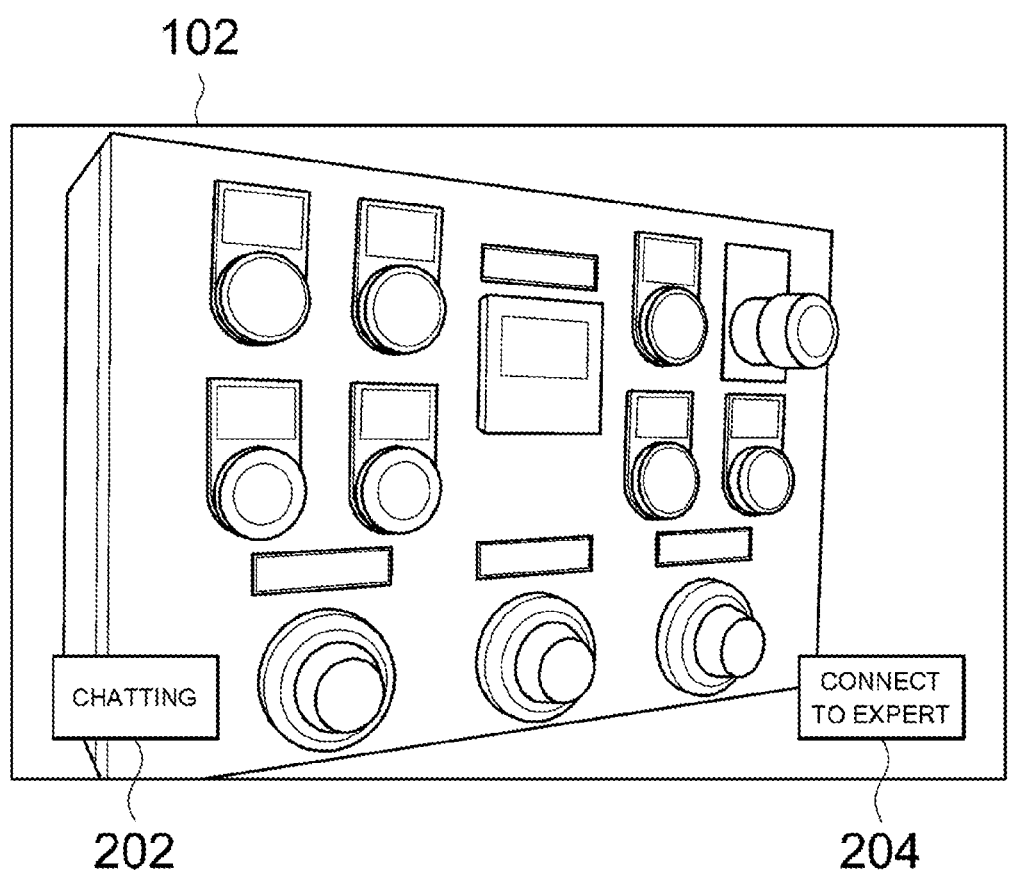
FIG. 2 is an example diagram showing a display screen of a first terminal in an augmented reality-based video calling system according to an embodiment of the present disclosure.
Figure 3:
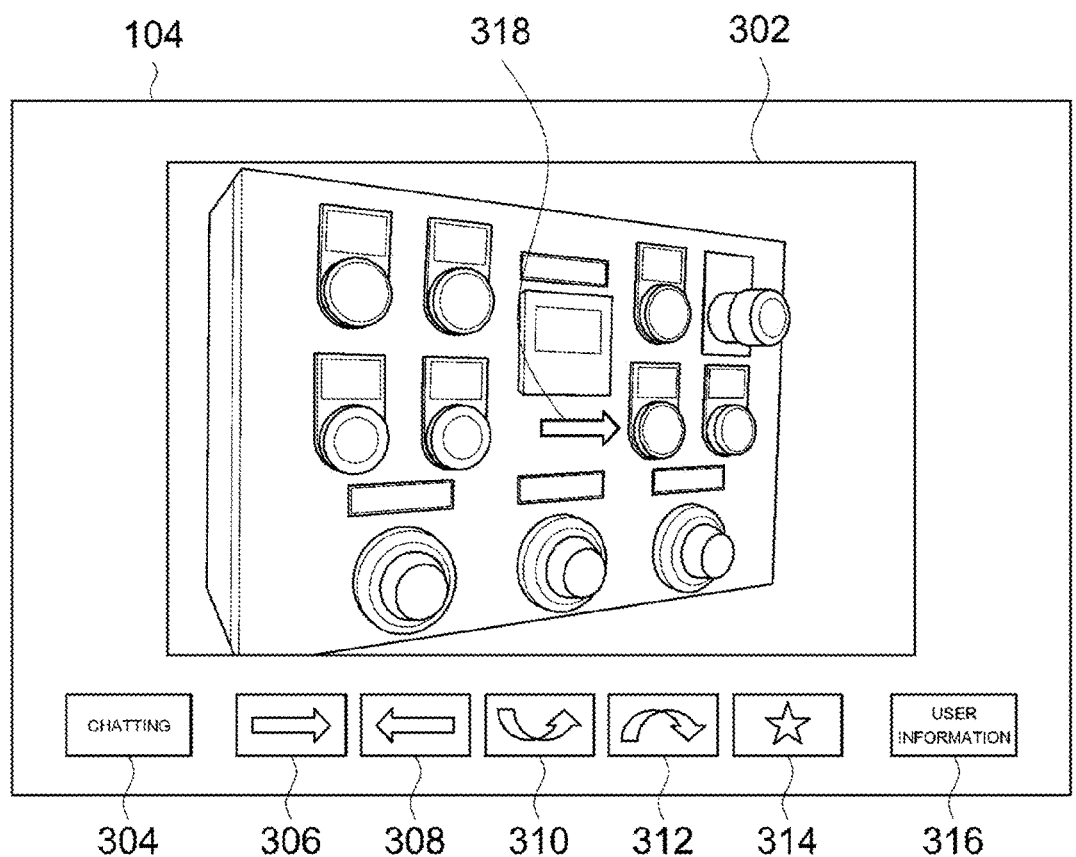
FIG. 3 is an example diagram showing a display screen of a second terminal in an augmented reality-based video calling system according to an embodiment of the present disclosure.
Figure 4:
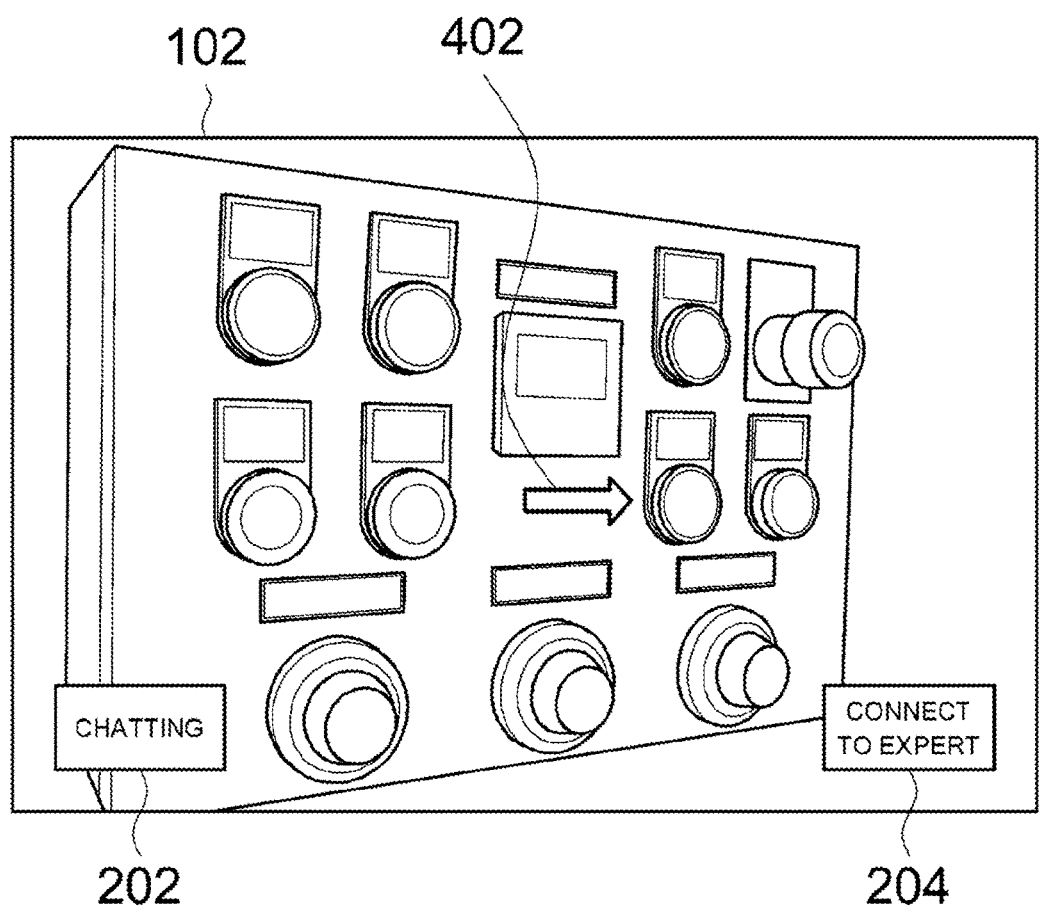
FIG. 4 is an example diagram showing an example in which virtual content is combined with a video and displayed on a first terminal according to an embodiment of the present disclosure.

FIGS. 2 to 4 are example diagrams illustrating a video call processing process of the augmented reality-based video calling system 100 according to an embodiment of the present disclosure. First, FIG. 2 is an example diagram showing a display screen of the first terminal 102 in the augmented reality-based video calling system 100 according to an embodiment of the present disclosure. As shown in FIG. 2, the first terminal 102 may display a video currently being captured on the screen. Also, the screen may include one or more buttons 202 and 204 for chatting with or making a video call to a user of another terminal. For example, the button 202 may be a button for chatting with a user of another terminal, and the button 204 may be a button for making a video call to a user of another terminal. In this case, a user of the first terminal 102 may touch the button 204 to try to make a video call to the second terminal 104.

First, FIG. 3 is an example diagram showing a display screen of the second terminal 104 in the augmented reality-based video calling system 100 according to an embodiment of the present disclosure. When the second terminal 104 makes a video call to the first terminal 102, a video 302 received from the first terminal 102 is displayed on the second terminal 104. Also, one or more buttons 306 to 314 for adding virtual content to the video may be displayed on the screen of the second terminal 104. As described above, the virtual content may be a figure such as a circle, a polygon, an arrow, and a star, text, a work manual, or an image. The user of the second terminal 104 may add the virtual content to the video by selecting one of the one or more buttons and designating an output position of the virtual content corresponding to the selected button on the screen. For example, the user of the second terminal 104 may designate the output position of the virtual content by touching a specific point of the video through a touch interface. Also, the user of the second terminal 104 may readjust a position of output virtual content, or rotate virtual content, or adjust a size of virtual content by using a drag gesture or a pinch gesture using a multi-touch interface. In an illustrated embodiment, as an example, arrow-type virtual content 318 is output to a screen. Also, additional buttons 304 and 316 for chatting with the first terminal 102 or displaying user information may be provided to the screen of the second terminal 104 in addition to the one or more buttons.

FIG. 4 is an example diagram showing an example in which virtual content is combined with a video and displayed on the first terminal 102 according to an embodiment of the present disclosure. As described above, when the user of the second terminal 104 adds virtual content to a video, the second terminal 104 transmits information regarding the added virtual content to the first terminal 102. In this case, the information regarding the virtual content may include information regarding the type of the virtual content (the form of the virtual content, identification information, or the like) and 2D position coordinates of the virtual content in the video. Among these, the 2D position coordinates indicates the point at which the virtual content is positioned in the video. For example, the 2D position coordinates may be coordinates of a starting point of the virtual content in the video.

An object to be photographed by the first terminal 102 is a 3D space, but a video obtained by photographing the object includes only 2D information. Accordingly, when the first terminal 102 receives the information regarding the virtual content from the second terminal 104 and displays the virtual content on the screen on the basis of the received information, the virtual content is present at the same position in the screen although a position of an object to be photographed in the video is changed due to movement of the first terminal 102. In this case, as a result, the virtual content may be present at a position unintended by the second terminal 104. According to an embodiment of the present disclosure, in order to resolve an inconsistency between the virtual content and the screen, the first terminal 102 is configured to recognize a 3D space from the video and position the virtual content in the recognized space. Thus, the virtual content may continue to be present at the same spatial position although the first terminal 102 moves. This will be described in more detail as follows.

When the information regarding the virtual content is received from the second terminal 104, the first terminal 102 generates a 3D spatial map from a video acquired through a video capturing means. In an embodiment, the first terminal 102 may extract one or more feature points from videos that are consecutively input through the video capturing means. As described above, a camera video includes only 2D planar information, but 3D spatial information may be inferred by analyzing a relationship between consecutive frames. For example, the first terminal 102 may generate the 3D spatial map from the video by using an algorithm such as Features from accelerated segment test (FAST), scale invariant feature transform (SIFT), histogram of oriented gradient (HOG), speeded up robust features (SURF), or the like. However, embodiments of the present disclosure are not limited to a certain type of algorithm.

When the 3D spatial map is generated, the first terminal 102 calculates a depth of a point corresponding to the 2D position coordinates in the generated 3D spatial map. Feature points on the 3D spatial map each have depth information corresponding to a distance from a camera to a corresponding feature point. Accordingly, the first terminal 102 may use the depth information to calculate the depth of the point corresponding to the 2D position coordinates.

In an embodiment, the first terminal 102 may select N feature points (here, N is a natural number greater than or equal to 1) in increasing order of distance from the 2D position coordinates from among feature points in the 3D spatial map and may calculate the depth of the point corresponding to the 2D position coordinates from depths of the selected N feature points. For example, the first terminal 102 may set an average or median of the depths of the selected N feature points as the depth corresponding to the 2D position coordinates.

Subsequently, the first terminal 102 combines the 2D position coordinates with the depth to generate 3D position coordinates of the virtual content and renders virtual content 402 on the generated 3D position coordinates.

As described above, according to embodiments of the present disclosure, the first terminal 102 calculates a depth of the virtual content in the space and positions the virtual content in the video using the calculated depth. Thus, according to embodiments of the present disclosure, the virtual content is not present on a 2D plane, but is represented in the video in the form of an object that is actually present in a 3D space. Also, the calculation of the depth and the generation of the 3D position coordinates, which have been described above, are repeatedly performed at predetermined intervals, and thus the virtual content may be changed dynamically such that the virtual content continues to be indicated at the same point in the space even when the first terminal 102 moves after the virtual content is received. Accordingly, according to embodiments of the present disclosure, users of a video call may exchange information through a screen as if they actually position content on a 3D space, and thus it is possible to increase efficiency in delivering information through video call.

In an embodiment, the first terminal 102 and the second terminal 104 may be each implemented on at least one processor and a computing apparatus including a computer-readable recording medium connected to the processor. The computer-readable recording medium may be inside or outside the processor and may be connected to the processor using various well-known means. A processor in the computing apparatus may allow the computing apparatus to operate according to an example embodiment disclosed in this specification. For example, the processor may execute instructions stored in the computer-readable recording medium. The instructions stored in the computer-readable recording medium may be configured to allow the computing to apparatus to perform operations according to an example embodiment disclosed in this specification when the instructions are executed by the processor.

Figure 5:
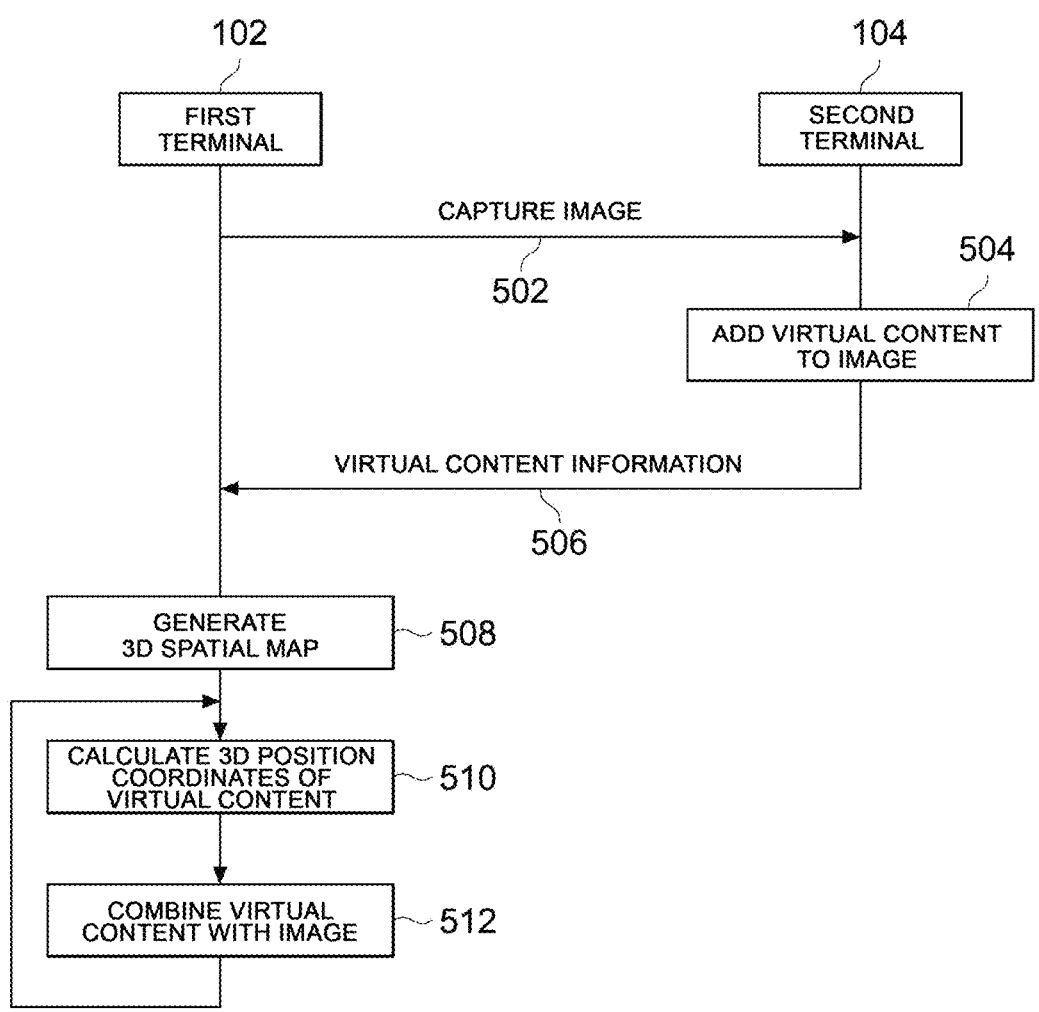
FIG. 5 is a sequence diagram illustrating a video calling method according to an embodiment of the present disclosure.

FIG. 5 is a sequence diagram illustrating a video calling method according to an embodiment of the present disclosure. The illustrated method may be performed by, for example, the first terminal 102 or the second terminal 104. In the illustrated sequence diagram, the method will be described as having a plurality of steps. However, at least some of the steps may be performed in a changed order, performed in combination with another step, omitted, divided into sub-steps and then performed, or performed in addition to one or more steps that are not shown.

In 502, the first terminal 102 captures a video and transmits the captured video to the second terminal 104.

In 504, the second terminal 104 adds virtual content to the video received from the first terminal 102.

In 506, the second terminal 104 provides information regarding the added virtual content to the first terminal 102. The information regarding the virtual content may include information regarding the type of the virtual content and two-dimensional position coordinates of the virtual content in the video.

In 508, the first terminal 102 generates a 3D spatial map from the video. Details associated with the 3D spatial map have been described above.

In 510, the first terminal 102 calculates 3D position coordinates of the virtual content on a 3D space corresponding to the video on the basis of the received information regarding the virtual content. In detail, the first terminal 102 may calculate a depth of a point corresponding to the 2D position coordinates in the generated 3D spatial map and may generate the 3D position coordinates by combining the 2D position coordinates with the calculated depth. Also, the first terminal 102 may select N feature points (here, N is a natural number greater than or equal to 1) adjacent to the 2D position coordinates from among feature points in the 3D spatial map and may calculate the depth of the point corresponding to the 2D position coordinates from depths of the selected N feature points.

In 512, the first terminal 102 combines the virtual content with the video using the calculated 3D position coordinates and displays the virtual content combined with the video.

Embodiments of the present disclosure may include a computer-readable recording medium including a program for executing the method described herein on a computer. The computer-readable recording medium may include any one or a combination of program instructions, a local data file, a local data structure, etc. The medium may be designed and configured specifically for the present disclosure or may be generally available in the field of computer software. Examples of the computer-readable recording medium include a magnetic medium, such as a hard disk, a floppy disk, and a magnetic tape, an optical recording medium, such as a CD-ROM and a DVD, and a hardware device specially configured to store and execute a program instruction, such as a ROM, a RAM, and a flash memory. Examples of the program instructions may include machine code generated by a compiler and high-level language code that can be executed in a computer using an interpreter.

According to embodiments of the present disclosure, it is possible to facilitate an exchange of information between video calling participants and also increase an application range of video calling by delivering augmented reality content between the calling participants in the form of additional information during the video calling.

Although example embodiments of the present disclosure have been described in detail, it should be understood by those skilled in the art that various changes may be made without departing from the spirit or scope of the present disclosure. Therefore, the scope of the present disclosure is to be determined by the following claims and their equivalents, and is not restricted or limited by the foregoing detailed description.

What is claimed is:

1. An augmented reality-based video calling system comprising:
   a first terminal configured to capture an image and transmit the image; and
   a second terminal configured to receive the image transmitted by the first terminal, add virtual content to the image and provide information regarding the added virtual content to the first terminal,
   wherein the first terminal receives the information provided by the second terminal, calculates three-dimensional (3D) position coordinates of the virtual content in a 3D space corresponding to the image on the basis of the information, combines the virtual content with the image using the calculated 3D position coordinates, and displays the virtual content combined with the image
   wherein the first terminal generates a 3D spatial map from the image, selects N feature points adjacent to two-dimensional (2D) position coordinates of the virtual content in the image from among feature points in the 3D spatial map, N is a natural number greater than or equal to 1, and calculates a depth of a point corresponding to the 2D position coordinates from depths of the selected N feature points.

2. The augmented reality-based video calling system of claim 1, wherein the information regarding the virtual content includes information regarding a type of the virtual content and the 2D position coordinates.

3. The augmented reality-based video calling system of claim 2, wherein the first terminal combines the 2D position coordinates with the calculated depth to generate the 3D position coordinates.

4. The augmented reality-based video calling system of claim 3, wherein the first terminal recalculates the 3D position coordinates at predetermined intervals.

5. An augmented reality-based video calling method, which is performed by a computing apparatus including one or more processors and a memory configured to store one or more programs executed by the one or more processors, the augmented reality-based video calling method comprising:
   capturing an image and transmitting the captured image to a partner terminal for video calling;
   receiving information regarding virtual content added to the image from the partner terminal;
   calculating three-dimensional (3D) position coordinates of the virtual content in a 3D space corresponding to the image on the basis of the received information regarding the virtual content; and
   combining the virtual content with the image using the calculated 3D position coordinates and displaying the virtual content combined with the image
   wherein the calculating of 3D position coordinates comprises:
   generating a 3D spatial map from the image; and
   selecting N feature points adjacent to two-dimensional (2D) position coordinates of the virtual content in the image from among feature points in the 3D spatial map, where N is a natural number greater than or equal to 1, and calculating a depth of a point corresponding to the 2D position coordinates from depths of the selected N feature points.

6. The augmented reality-based video calling method of claim 5, wherein the information regarding the virtual content includes information regarding a type of the virtual content and the 2D position coordinates.

7. The augmented reality-based video calling method of claim 6, wherein the calculating of 3D position coordinates comprises:
combining the 2D position coordinates with the calculated depth to generate the 3D position coordinates.

8. A computer program stored in a non-transitory computer-readable storage medium, the computer program comprising:
one or more instructions, wherein, when the instructions are executed by a computing apparatus having one or more processors, the instructions enable the computing apparatus to perform operations of:
capturing an image and transmitting the captured image to a partner terminal for video calling;
receiving information regarding virtual content added to the image from the partner terminal;
calculating three-dimensional (3D) position coordinates of the virtual content in a 3D space corresponding to the image on the basis of the received information regarding the virtual content; and
combining the virtual content with the image using the calculated 3D position coordinates and displaying the virtual content combined with the image
wherein the calculating of 3D position coordinates comprises:
generating a 3D spatial map from the image; and
selecting N feature points adjacent to two-dimensional (2D) position coordinates of the virtual content in the image from among feature points in the 3D spatial map, where N is a natural number greater than or equal to 1, and calculating a depth of a point corresponding to the 2D position coordinates from depths of the selected N feature points.

* * * * *